(12) United States Patent
Koh et al.

(10) Patent No.: US 12,302,304 B2
(45) Date of Patent: *May 13, 2025

(54) COMMUNICATION APPARATUSES AND COMMUNICATION METHODS FOR 5G NR BASED V2X COMMUNICATIONS

(71) Applicant: Panasonic Intellectual Property Corporation of America, Torrance, CA (US)

(72) Inventors: Tien Ming Benjamin Koh, Singapore (SG); Hidetoshi Suzuki, Kanagawa (JP); Lilei Wang, Beijing (CN); Madhav Gupta, Singapore (SG); Lei Huang, Singapore (SG); Yang Kang, Singapore (SG); Chan Wah Ng, Singapore (SG); Hong Cheng Michael Sim, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,912

(22) Filed: May 9, 2024

(65) Prior Publication Data
US 2024/0292396 A1    Aug. 29, 2024

Related U.S. Application Data

(63) Continuation of application No. 18/064,841, filed on Dec. 12, 2022, now Pat. No. 12,016,004, which is a
(Continued)

(51) Int. Cl.
H04W 72/0453    (2023.01)
H04W 72/20      (2023.01)
(Continued)

(52) U.S. Cl.
CPC ....... *H04W 72/0453* (2013.01); *H04W 72/20* (2023.01); *H04W 4/40* (2018.02); *H04W 88/04* (2013.01)

(58) Field of Classification Search
CPC ... H04W 72/0453; H04W 72/20; H04W 4/40; H04W 88/04
See application file for complete search history.

(56) References Cited

U.S. PATENT DOCUMENTS 11,219,035 B2 *   1/2022   Lee .............. H04W 72/56
2010/0080155 A1   4/2010   Suzuki et al.
(Continued)

FOREIGN PATENT DOCUMENTS

CN    106165524 A    11/2016
CN    108632787 A    10/2018
(Continued)

OTHER PUBLICATIONS

Catt, "Resource Allocation for UE-to-Network relay operation," R1-152574, Agenda Item: 6.2.3.1, 3GPP TSG RAN WG1 Meeting #81, Fukuoka, Japan, May 25-29, 2015, 4 pages.
(Continued)

*Primary Examiner* — Ajay Cattungal
(74) *Attorney, Agent, or Firm* — Seed IP Law Group LLP

(57) ABSTRACT

The present disclosure provides communication apparatuses and communication methods for 5G NR based V2X communications. The communication apparatuses include a communication apparatus which comprises a receiver, which in operation, receives from a base station a first resource information indicating a first resource allocated by the base station; and a transmitter, which in operation, transmits to a target communication apparatus or a plurality of target communication apparatuses including the target communication apparatus a second resource information
(Continued)

indicating a second resource allocated to at least the target communication apparatus, the second resource including a whole or a part of the first resource.

7 Claims, 8 Drawing Sheets

Related U.S. Application Data continuation of application No. 17/257,379, filed as application No. PCT/CN2018/118658 on Nov. 30, 2018, now Pat. No. 11,570,779.

(51) Int. Cl.
*H04W 4/40* (2018.01)
*H04W 88/04* (2009.01)

(56) References Cited

U.S. PATENT DOCUMENTS

| | | |
|---|---|---|
| 2010/0325226 A1 | 12/2010 | McBeath et al. |
| 2015/0181587 A1* | 6/2015 | Yang ................... H04L 1/0061 370/329 |
| 2015/0215903 A1 | 7/2015 | Zhao et al. |
| 2016/0192424 A1 | 6/2016 | Suzuki et al. |
| 2016/0302231 A1* | 10/2016 | Chien ................... H04W 72/23 |
| 2017/0201461 A1 | 7/2017 | Cheng et al. |
| 2017/0223699 A1 | 8/2017 | Yasukawa et al. |
| 2018/0092017 A1 | 3/2018 | Freda et al. |
| 2018/0132211 A1* | 5/2018 | Huang ................... H04W 72/23 |
| 2018/0198539 A1 | 7/2018 | Kim et al. |
| 2018/0227980 A1 | 8/2018 | Uchino et al. |
| 2018/0279096 A1 | 9/2018 | Wu et al. |
| 2020/0021950 A1 | 1/2020 | Ma et al. |
| 2020/0136760 A1* | 4/2020 | Hahn ................... H04W 72/04 |
| 2020/0178290 A1* | 6/2020 | Lee ....................... H04W 72/20 |
| 2020/0187243 A1 | 6/2020 | Dudda et al. |
| 2021/0289380 A1 | 9/2021 | Chae et al. |

FOREIGN PATENT DOCUMENTS

| | | |
|---|---|---|
| EP | 3089535 A1 | 11/2016 |
| JP | 2016039510 A | 3/2016 |
| JP | 2018515969 A | 6/2018 |
| WO | 2017027355 A1 | 2/2017 |

OTHER PUBLICATIONS

International Search Reported, mailed Sep. 2, 2019, for corresponding International Application No. PCT/CN2018/118658, 2 pages.

* cited by examiner

```
-- ASN1START
SL-V2X-ConfigDedicated-r14 ::=         SEQUENCE {
    commTxResources-r14                    CHOICE {
        release                                NULL,
        setup                                  CHOICE {
            scheduled-r14                          SEQUENCE {
                sl-V-RNTI-r14                          C-RNTI,
                mac-MainConfig-r14                     MAC-MainConfigSL-r12,
202 ──          v2x-SchedulingPool-r14                 SL-CommResourcePoolV2X-r14        OPTIONAL, -- Need ON
                mcs-r14                                INTEGER (0..31)                   OPTIONAL, -- Need OR
                logicalChGroupInfoList-r14             LogicalChGroupInfoList-r13
            },
            ue-Selected-r14                        SEQUENCE {
                -- Pool for normal usage
                v2x-CommTxPoolNormalDedicated-r14      SEQUENCE {
                    poolToReleaseList-r14                  SL-TxPoolToReleaseListV2X-r14   OPTIONAL, -- Need ON
                    poolToAddModList-r14                   SL-TxPoolToAddModListV2X-r14    OPTIONAL, -- Need ON
                    v2-CommTxPoolSensingConfig-r14         SL-CommTxPoolSensingConfig-r14
                                                                               OPTIONAL -- Need ON
                }
            }
        }
    },
...(unchanged)
}

SL-TxPoolToAddModListV2X-r14 ::=      SEQUENCE (SIZE (1..maxSL-V2X-TxPool-r14)) OF SL-TxPoolToAddMod-r14

SL-TxPoolToAddMod-r14 ::=              SEQUENCE {
    poolIdentity-r14                       SL-V2X-TxPoolIdentity-r14,
    pool-r14                               SL-CommResourcePoolV2X-r14 ── 204
}

...(unchanged)
-- ASN1STOP
```

Fig. 2

```
-- ASN1START
... (unchanged)
SL-CommResourcePoolV2X-r14 ::=    SEQUENCE {
... (unchanged)
    expiryTimer                              ENUMERATED {n1, ... }           OPTIONAL,
    allowedSourceID                          SL-DestinationIdentity-r12      OPTIONAL,
    (alternative) allowedSourceIDList        SL-DestinationInfoList-r12      OPTIONAL,
    allowedDestination                       SL-DestinationIdentity-r12      OPTIONAL,
    (alternative) allowedDestinationIDList   SL-DestinationInfoList-r12      OPTIONAL,
}
-- ASN1STOP
```

Fig. 3

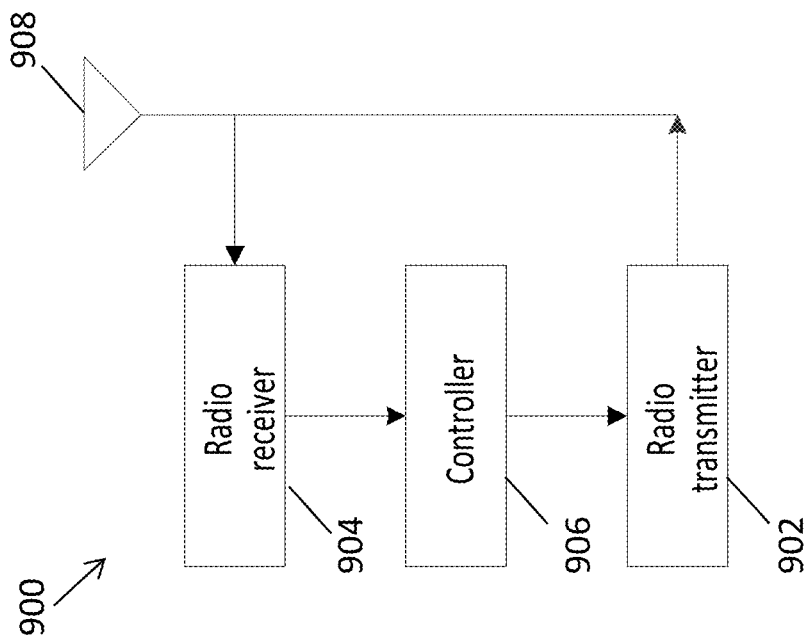
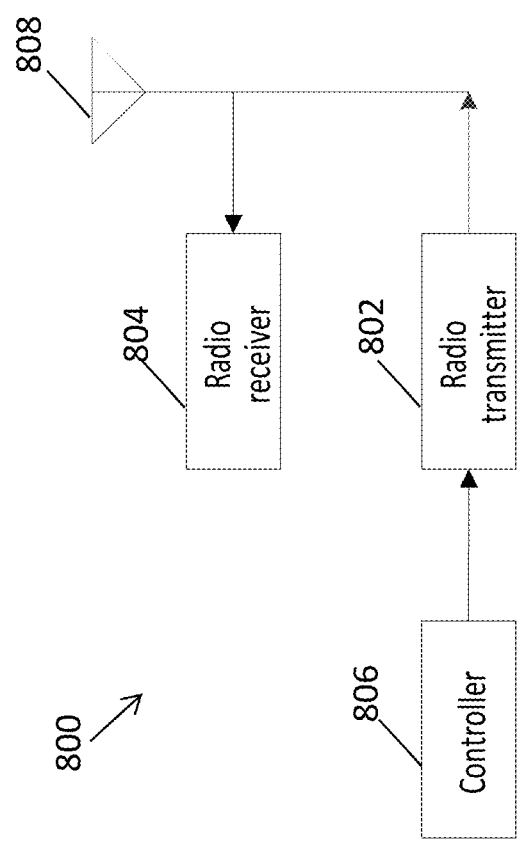

COMMUNICATION APPARATUSES AND COMMUNICATION METHODS FOR 5G NR BASED V2X COMMUNICATIONS

TECHNICAL FIELD

The following disclosure relates to communication apparatuses and communication methods for $5^{th}$ generation (5G) New Radio (NR) communications, and more particularly to communication apparatuses and communication methods for 5G NR based vehicle to everything (V2X) communications.

BACKGROUND

V2X communications allows vehicles to interact with public roads and other road users, and is thus considered a critical factor in making autonomous vehicles a reality.

To accelerate this process, 5G NR based V2X communications (interchangeably referred to as NR V2X communications) is being discussed by the 3rd Generation Partnership Project (3GPP) to identify technical solutions for advanced V2X services, through which vehicles (i.e. interchangeably referred to as communication apparatuses or user equipments (UEs) that support V2X applications) can exchange their own status information through sidelink with other nearby vehicles, infrastructure nodes and/or pedestrians. The status information includes information on position, speed, heading, etc.

The NR V2X communications is expected to complement Cellular V2X communications for the advanced V2X services and support interworking with Cellular V2X communications.

Cellular V2X deployment details largely depend on agreements between regulators, operators and manufacturers (e.g. car original equipment manufacturers (OEMs), automotive ecosystem manufacturers, etc.) and may vary across countries and regions. It is envisioned that:

For basic safety-related V2X services, communications would occur over publicly accessible spectrum (e.g. USA: 5850-5925 MHz).

For specialised services (e.g. HD video/sensor sharing between platoon members), public spectrum may be supplemented with licensed resources obtained from operators.

Typically, resources assigned (which are considered as licensed resources) by base stations of operators are relatively semi-static or slower compared to dynamic requirements of certain advanced V2X scenarios such as collective perception of environment. There has been no discussion so far on how an operator can grant additional (licensed) resources to a subscriber UE (e.g. a communication apparatus/module of a vehicle that has subscribed to the operator's communication services) that can be further shared with one or more target UEs (e.g. communication apparatuses/modules of one or more vehicles that form a platoon with the subscriber UE or in certain proximity with the subscriber UE).

There is thus a need for communication apparatuses and methods that can solve the above mentioned drawbacks to allow subscriber UEs to flexibly sub-allocate and transmit licensed resources to one or more target UEs. Furthermore, other desirable features and characteristics will become apparent from the subsequent detailed description and the appended claims, taken in conjunction with the accompanying drawings and this background of the disclosure.

SUMMARY

One non-limiting and exemplary embodiment facilitates allocation and/or transmission of licensed resources in 5G NR based V2X communications in a dynamic and reliable manner.

In one aspect, the techniques disclosed herein provide a communication apparatus. For example, the communication apparatus can be a subscriber UE, which may be a communication module integrated or installed in a vehicle subscribed to communication services of a telecommunications operator/public land mobile network (PLMN) operator. The communication apparatus comprises a receiver, which in operation, receives from a base station information of a first resource indicating a first resource allocated by the base station; and a transmitter, which in operation, transmits to a target communication apparatus or a plurality of target communication apparatuses including the target communication apparatus information of a second resource indicating a second resource allocated to at least the target communication apparatus, the second resource including a whole or a part of the first resource.

In another aspect, the techniques disclosed herein provide a target communication apparatus. For example, the target communication apparatus can be a target UE, which may be a communication module integrated or installed in a vehicle that has a direct connectivity with the subscriber UE or a communication module integrated or installed in a member vehicle within a platoon that the subscribe UE belongs to. In addition to the target UE and the subscribe UE, the platoon may comprise one or more other target UEs. The target communication apparatus comprises a receiver, which in operation, receives from a communication apparatus information of a second resource indicating a second resource allocated to at least the target communication apparatus, wherein the second resource includes a whole or a part of a first resource allocated to the communication apparatus by a base station; and a transmitter, which in operation, transmits a signal to the communication apparatus or to another target communication apparatus among a plurality of target communication apparatuses that includes the target communication apparatus using the second resource.

In another aspect, the techniques disclosed herein provide a communication method. The communication method comprises receiving, at a communication apparatus, from a base station information of a first resource indicating a first resource allocated by the base station; and transmitting, from the communication apparatus, to a target communication apparatus or a plurality of target communication apparatuses including the target communication apparatus information of a second resource indicating a second resource allocated to at least the target communication apparatus, the second resource including a whole or a part of the first resource.

In yet another aspect, the techniques disclosed herein provide another communication method. The communication method comprises receiving, at a target communication apparatus, from a communication apparatus information of a second resource indicating a second resource allocated to at least the target communication apparatus, wherein the second resource includes a whole or a part of a first resource allocated to the communication apparatus by a base station; and transmitting, from the target communication apparatus, a signal to the communication apparatus or to another target communication apparatus among a plurality of target communication apparatuses that includes the target communication apparatus using the second resource.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 2 shows an example of dedicated signaling for transmitting information of a first resource a base station to a communication apparatus. The information of the first resource may be interchangeably referred to as the first resource information.

FIG. 3 shows an example of dedicated signaling for transmitting information of a second resource from a communication apparatus to one or more target communication apparatuses. The information of the second resource may be interchangeably referred to as the second resource information.

FIG. 8 shows a schematic example of communication apparatus that can be implemented to establish the 5G NR based V2X communications in accordance with various embodiments as shown in FIGS. 1 to 7.

FIG. 9 shows a schematic example of target communication apparatuses that can be implemented to establish the 5G NR based V2X communications in accordance with various embodiments as shown in FIGS. 1 to 7.

Figure 1:
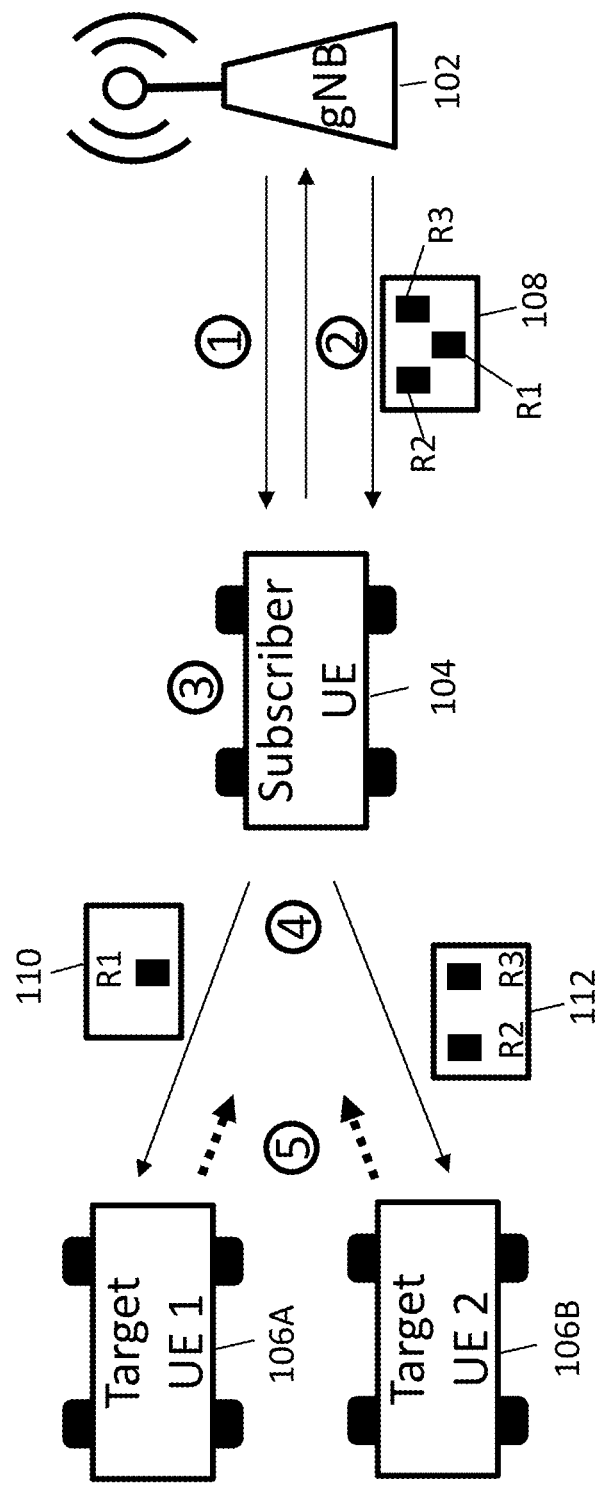
FIG. 1 shows a schematic example 100 of 5G NR based V2X communications that allows communication apparatuses to flexibly sub-allocate and transmit resources to one or more target communication apparatuses.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Some embodiments of the present disclosure will be described, by way of example only, with reference to the drawings. Like reference numerals and characters in the drawings refer to like elements or equivalents.

As described above, the NR V2X communications of the present disclosure is designed to complement Cellular V2X communications for advanced V2X services, which are categorised into four groups: vehicles platooning, extended sensors, advanced driving and remote driving.

Vehicles platooning enables vehicles to dynamically form a platoon travelling together. All the vehicles in the platoon obtain information from a leading vehicle to manage this platoon. Such information allows the vehicles to drive closer than normal in a coordinated manner, going to the same direction and travelling together.

Extended sensors enables the exchange of raw or processed data gathered through local sensors or live video images among vehicles, road site units (RSUs), devices of pedestrian and V2X application servers. The vehicles can increase the perception of their environment beyond of what their own sensors can detect and have a more broad and holistic view of the local situation.

Advanced driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used.

In the above described advanced V2X services, for example, in a vehicles platooning service, the communication between the member vehicles of the platoon is rather private and thus requires private communication resources that are dedicated for the platooning. Private communication resources are usually assigned by telecommunication operators/public land mobile network (PLMN) operators as per requests by the subscribers, at cost. Out of cost-saving consideration, in various cases, only the leading vehicle of the platoon requests for the private communication resources and shares the private communication resources with its fellow member vehicles in the platoon.

In known V2X communication techniques, the private communication resources are assigned by the telecommunication/PLMN operators with indication of permitted users being the member vehicles in the platoon at the time of the leading vehicle requesting for the private communication resources.

However, it is possible that as the journey continues, one or more member vehicles in the platoon may reach their destinations and exit the platoon while one or more new member vehicles joining to the platoon. In such scenarios, the previously assigned private communication resources have vacant resources that could be used by the new member vehicles. However, due to the static indication of permitted users, the leading vehicle is not able to sub-allocate and transmit those vacant resources with the new member vehicles.

Similarly, in an extended sensors service, a vehicle may need to obtain sensor data from different road site units one at a time, e.g. traffic lights of the respective next intersections. In the known V2X communication techniques, due to the static indication of permitted users, the private communication resources previously assigned to the vehicle when it is approaching traffic light A of Intersection A cannot be sub-allocated and transmitted by the vehicle to traffic light B when it later approaches Intersection B.

In the following paragraphs, certain exemplifying embodiments are explained with reference to a NR V2X communications mechanism between a communication apparatus and one or more target communication apparatuses that advantageously allows the communication apparatus to flexibly sub-allocate and transmit licensed resources to one or more target communication apparatuses. For the sake of simplicity, the private communication resources assigned by the telecommunication/PLMN operators may be interchangeably referred to as resources, dedicated resources or licensed resources in the present disclosure.

FIG. 1 depicts a schematic example 100 of a 5G NR based V2X communication that allows communication apparatuses to flexibly sub-allocate and transmit resources to a plurality of target communication apparatuses.

As described above, the communication apparatuses may be interchangeably referred to as subscriber UEs. The subscriber UEs include communication modules integrated or installed in vehicles subscribed to communication services of one or more telecommunications/PLMN operators. For the sake of simplicity, the schematic example 100 as shown in FIG. 1 includes one subscriber UE/communication apparatus 104.

In the schematic example 100, the communication apparatus 104 is subscribed to a telecommunication/PLMN operator (not shown) and communicates with a base station 102 of the telecommunication operator. In the present example, the base station 102 is a next generation NodeB (gNB) 102. It can be appreciated by those skilled in the art that the base station 102 can also be a ng-eNB, which is a node providing Evolved Universal Mobile Telecommunications System (UMTS) Terrestrial Radio Access (E-UTRA) user plane and control plane protocol terminations towards the communication apparatus 104, and connected via the NG interface to the 5G core network.

In various embodiments, the communication apparatus 104 includes a receiver, which in operation, receives information of a first resource from the base station 102, as shown in step 2 of FIG. 1. For the sake of simplicity, the receiver is not shown in FIG. 1. The information of the first resource may be interchangeably referred to as the first resource information. The first resource information indicates a first resource 108 allocated by the base station 102. In some examples, the first resource 108 includes one or more carrier frequencies/frequency bands (e.g. R1, R2 and R3 as shown in FIG. 1) allocated to the communication apparatus 104. In some other examples, multiple resources may be defined within a single carrier. Therefore, public/common resources and private resources may exist within different time-frequency resources of the same carrier. As such, in an alternative embodiment, the first resource 108 includes one or more time-frequency resources of a carrier allocated to the communication apparatus 104.

The one or more carrier frequencies/frequency bands or one or more time-frequency resources of a carrier allocated to the communication apparatus 104 are dedicated for V2X communications with target communication apparatuses. Such a V2X communication may be considered as a V2X sidelink communication.

The first resource 108 is different from a resource directly allocated to a target communication apparatus or a plurality of target communication apparatuses by the base station 102. In addition, the first resource 108 that includes one or more carrier frequencies/frequency bands or one or more time-frequency resources of a carrier dedicated to the communication apparatus 104 for V2X communications with target communication apparatuses may be considered as a private resource pool. Likewise, the base station 102 may define a public/common resource that include certain carrier frequencies/frequency bands or certain time-frequency resources of the same carrier as the first resource 108, which may be considered as a public/common resource pool. In some embodiments, some information elements/fields in the first resource information may be configured to control how the communication apparatus 104 can utilise the first resource 108. An example of the first resource information is shown in FIG. 2.

In various embodiments, the communication apparatus 104 also includes a transmitter, which in operation, transmits to a target communication apparatus or a plurality of target communication apparatuses information of a second resource indicating a second resource allocated to at least the target communication apparatus, as shown in step 4 of FIG. 1. The plurality of target communication apparatuses include the target communication apparatus. The second resource includes a whole or a part of the first resource. For the sake of simplicity, the transmitter is not shown in FIG. 1, and the information of the second resource indicating may be interchangeably referred to as the second resource information.

In some examples, as shown in step 1 of FIG. 1, prior to receiving the first resource information from the base station 102 as shown in step 2 of FIG. 1, the communication apparatus 104 may acquire system information blocks (SIBs) broadcast by the base station 102, especially system information block type 21 (SIB 21) and/or system information block type 26 (SIB 26) that define carrier frequency information for V2X sidelink communications; and transmit its sidelinkUEinformation to the base station 102 so as to request allocation of the first resource 108 from the base station. It is appreciable to the skilled person that a new system information block type may be defined by the 3GPP for NR V2X communications. Alternatively or additionally, when such a new SIB is defined, the communication apparatus 104 may also acquire the new SIBs from the base station 102 in step 1. In some embodiments, the sidelinkUEinformation may include information relating to a plurality of target communication apparatuses so that the base station 102 may assign resources appropriately. In some other embodiments, the sidelinkUEinformation may not include the information relating to the plurality of target communication apparatuses, so that the subsequent allocation of second resources by the communication apparatus 104 may be more dynamic and flexible.

In some examples, the transmission of the second resource as shown in step 4 of FIG. 1 may be initiated by the communication apparatus 104 autonomously and dynamically sub-allocating the first resource 108 as a second resource 110, 112 to one or more target communication apparatuses, as shown in step 3 of FIG. 1.

In some other examples, the transmission of the second resource as shown in step 4 of FIG. 1 may be initiated by the communication apparatus 104 in response to a request received from a server (not shown) of a V2X service application that requires the communication apparatus 104 to communicate with the target communication apparatuses 106A for an one time transfer and/or to communicate with the target communication apparatuses 106B for periodic updates regarding the V2X service in question, as shown in step 3 of FIG. 1.

As described above, a target communication apparatus may be interchangeably referred to as a target UE. A target communication apparatus can be a communication module integrated or installed in a vehicle that has a direct connectivity with the communication apparatus 104. Such a direct connectivity is considered a unicast level connection between the target communication apparatus and the communication apparatus 104.

Alternatively, a target communication apparatus can be a communication module integrated or installed in a member vehicle of a platoon that the communication apparatus 104 belongs to. For example, the communication apparatus 104 may form a platoon with a plurality of target communication apparatuses. In the platoon, the communication apparatus 104 may not have a unicast level connection with the respective individual target communication apparatuses, but instead have a group level connection with all the target communication apparatuses to the platoon.

In some embodiments, the communication apparatus 104 may be connected to a target communication apparatus 106A via a unicast level connection. The unicast level connection may be a sidelink-based Access Stratum (AS) level connection that exists independently of existing RRC connections between the base station 102 and the communication apparatus 104 or the target communication apparatus 106A.

In some alternative embodiments, as shown in FIG. 1, the communication apparatus 104 may be connected to a plurality of target communication apparatuses that include the target communication apparatus 106A and another target communication apparatus 106B. The communication apparatus 104, the target communication apparatus 106A, and the other target communication apparatus 106B may form a platoon and interconnected via a groupcast level connection. For example, the groupcast level connection may be dependent on an existing connection to a group/cluster head vehicle (e.g. the communication apparatus 104) or alternatively based on some metric depending upon the presence of other group members. The groupcast level connection may be a sidelink-based Access Stratum (AS) level connection that exists independently of existing RRC connections between the base station 102 and the communication apparatus 104, the target communication apparatus 106A or the other target communication apparatus 106B.

It is appreciable to those skilled in the art that, in other embodiments, the two target communication apparatuses 106A, 106B may each have a unicast level connection with the communication apparatus 104. In addition to the target communication apparatus 106A and the other target communication apparatus 106B, the platoon may comprise more group members (i.e. target communication apparatuses) that are not shown in FIG. 1.

In some embodiments, the communication apparatus 104 is connected to the target communication apparatus 106A via a unicast level connection. As such, there is a presence of an AS level connection between the communication apparatus 104 and the target communication apparatus 106A. In these embodiments, the communication apparatus 104 may allocate a part (e.g. R1) of the first resource 108 as a second resource 110 to the target communication apparatus 106A, as shown in step 3 of FIG. 1 and transmit information of the second resource 110 to the target communication apparatus 106A, as shown in step 4 of FIG. 1. From the perspective of the target communication apparatus 106A, at step 4 of FIG. 1, the target communication apparatus 106A receives the information of the second resource 110 from the communication apparatus 104. Alternatively, the second resource 110 may include all (e.g. R1, R2, R3) of the first resource 108. Once the information of the second resource 110 is successfully received by the target communication apparatus 106A, the second resource 110 may be used to establish a V2X communication between the communication apparatus 104 and the target communication apparatus 106A. For example, from the perspective of the communication apparatus 104, the communication apparatus 104 may utilise the second resource 110 to transmit a first signal (not shown) to the target communication apparatus 106A, and receive a second signal from the target communication apparatus 106A as shown in step 5 of FIG. 1, such that a V2X sidelink communication is established between the communication apparatus 104 and the target communication apparatus 106A for advanced V2X services. From the perspective of the target communication apparatus 106A, the target communication apparatus 106A may utilise the second resource 110 to receive the first signal from the communication apparatus 104, and transmit the second signal to the communication apparatus 104 as shown in step 5 of FIG. 1, such that a V2X sidelink communication is established between the communication apparatus 104 and the target communication apparatus 106A for advanced V2X services.

In some other embodiments, the communication apparatus 104 is connected to a plurality of target communication apparatuses that include the target communication apparatus 106A and the other target communication apparatus 106B via a groupcast level connection. As such, there is a presence of an AS level connection between the communication apparatus 104 and the plurality of target communication apparatuses. In these embodiments, the communication apparatus 104 and the plurality of target communication apparatuses may form a platoon.

In some examples, the communication apparatus 104 may allocate a whole (e.g. R1, R2, R3) or a part (e.g. R2, R3) of the first resource 108 as a second resource 112 to the target communication apparatus 106A and the other target communication apparatus 106B of the plurality of target communication apparatuses, and transmit information of the second resource 112 to the target communication apparatus 106A and the other target communication apparatus 106B. In this manner, the target communication apparatus 106A and the other target communication apparatus 106B may use the same second resource 112 for V2X communications with the communication apparatus 104, with each other, and/or with other target communication apparatuses in the platoon in a similar manner as described above with respect to the unicast level connection.

In some examples, the communication apparatus 104 may allocate different parts (R1; R2, R3) of the first resource 108 as different second resources 110, 112 to the target communication apparatus 106A and the other target communication apparatus 106B, respectively; and transmit information of the different second resources 110, 112 to the target communication apparatus 106A and the other target communication apparatus 106B respectively, as shown in step 4 of FIG. 1. In this manner, the target communication apparatus 106A and the other target communication apparatus 106B may use respective second resources 110, 112 for V2X communications with the communication apparatus 104, with each other, and/or with other target communication apparatuses in the platoon in a similar manner as described above with respect to the unicast level connection.

In the above examples, when transmitting the second resource(s) 110, 112 to the target communication apparatus 106A and the other target communication apparatus 106B, the communication apparatus 104 may indicate in information of a second resource that which entities in the platoon are allowed to use the second resource(s) 110, 112 for transmitting and/or receiving signals. For the sake of simplicity, the information of the second resource may be interchangeably referred to as the second resource information. For example, the second resource information may be indicated in a second resource information element. The second resource information element may include one or more fields/elements that indicate a list of target apparatus IDs that are allowed to transmit signals using the second resource(s) 110, 112 for V2X communications, a list of target apparatus IDs that are allowed to receive signals using the second resource(s) 110, 112 for V2X communications, an expiry timer that defines a time limit for each of the list of target apparatus IDs to use the second resource(s) 110, 112 each time, etc. In some embodiments, the expiry timer may be predetermined by the base station 102 and indicated in the second resource information element by the communication apparatus 104. In some embodiments, the expiry timer may be determined by the communication apparatus 104 and indicated in the second resource information element by the communication apparatus 104. In some other embodiments, the expiry timer may be predetermined by the base station 102 and broadcast to and known by all the connected communication apparatus and target communication apparatus in the system information blocks.

By virtue of the above dynamic allocation of the second source(s), the utilisation of the second source(s) is advantageously optimized. As a measure to ensure low latency and high reliability for V2X communications, it may be further advantageous to define in the second resource information element that all the target communication apparatuses in the platoon can use the second resource(s) 110, 112 for V2X communications as long as the target communication apparatus in question has an AS level connection with the platoon or is within a certain proximity with the communication apparatus 104. In this manner, any new member vehicles joining into the platoon and meeting the above requirements may be able to utilise the second resource(s) for V2X communications without requiring the communication apparatus 104 to request for new resources from the base station 102. Such an arrangement improves the flexibility of NR sidelink framework and allows easy extension of a NR system to support future developments of further advanced V2X services and other services.

In some embodiments, the second resource information element may include an indication of requiring an AS level connection as a prerequisite for allocation and transmission of resources. Such an arrangement may further lower latency and enhance reliability of the NR system. For example, when an AS level connection between the communication apparatus 104 with the target communication apparatus 106A, the other target communication apparatus 106B or the plurality of target communication apparatuses is lost, the communication apparatus 104 may withdraw the second resource allocated to the respective target communication apparatus or the plurality of target communication apparatuses. Likewise, the target communication apparatus 106A, the other target communication apparatus 106B or the plurality of target communication apparatuses may delete the respective second resource from available resources.

When there are more than one communication apparatus/subscriber UE providing resources for V2X communications in the platoon, it is also convenient and advantageous for a target communication apparatus in the platoon to choose which resource to use based on the one or more fields/elements indicated in the respective second resource information elements being transmitted by the different communication apparatuses/subscriber UEs. In other words, the one or more fields/elements facilitate the target communication apparatus to choose the second resource from a plurality of available resources for data transmission in V2X communications.

In the present disclosure, the receiver of the communication apparatus 104 may receive the first resource information from the base station 102 via a dedicated signaling. For example, the dedicated signaling may include a radio resource control (RRC) signaling, such as a RRCReconfiguration message including sl-V2X-ConfigDedicated with additional information elements contained within the RRCReconfiguration message that indicate that the mentioned resource is dedicated to the communication apparatus 104 and may be further shared.

Likewise, the transmitter of the communication apparatus 104 may transmit the second resource information to the target communication apparatus 106A, the other target communication apparatus 106B, and/or the plurality of target communication apparatuses via another dedicated signaling. For example, the other dedicated signaling may include a RRC signaling, a physical downlink control channel (PDCCH) signaling, or an application specific signaling (e.g. a car camera streaming application carries information about radio resources that can be used by another vehicles within a certain proximity or by other vehicles in a platoon).

FIG. 2 shows an example of the dedicated signaling for transmitting the first resource information from the base station 102 to the communication apparatus 104, in accordance with the present disclosure. In particular, the example shown in FIG. 2 lists possible information elements contained within the sl-V2X-ConfigDedicated field of a RRCReconfiguration message.

As shown in information element 202, FIG. 2 lists an example of extending an existing information element v2x-SchedulingPool-r14 with a new field or element SL-CommResourcePoolV2X-r14 to denote that it is a shareable resource. Alternatively, a new information element v2x-SharedPool-r16 can be defined to denote shareable resources.

In various embodiments, the communication apparatus 104 may receive the first resource information indicating the first resource 108 in an extended information element v2x-SchedulingPool-r14 and/or a new information element v2x-SharedPool-r16 in the sl-V2X-ConfigDedicated field of a RRCReconfiguration message transmitted from the base station 102.

The above first resource information is for indicating first resources automatically allocated by the base station 102 for V2X sidelink communications scheduled by the base station 102.

For V2X sidelink communications scheduled by the communication apparatus 104, the base station may extend an information element pool-r14 with a new field or element SL-CommResourcePoolV2X-r14 to denote that it is a shareable resource, as shown in information element 204 of FIG. 2. In these embodiments, the communication apparatus 104 may receive the first resource information indicating the first resource 108 in one or more extended information elements pool-r14 in the sl-V2X-ConfigDedicated field of a RRCReconfiguration message transmitted from the base station 102.

FIG. 3 shows an example of dedicated signaling for transmitting the second resource information from the communication apparatus 104 to the target communication apparatus 106A, the other target communication apparatus 106B or the plurality of target communication apparatuses, in accordance with the present disclosure. In particular, the example shown in FIG. 3 lists possible additional fields/information elements contained within the SL-CommResourcePool information element/field of a RRCReconfiguration message.

As shown in FIG. 3, the additional fields/information elements may include an expiryTimer 302, which may be in units of milliseconds to seconds. As described above, the expiryTimer 302 indicates a time limit or an expiry time. When a period of time following the transmission of the second resource information to the target communication apparatus 106A, the other target communication apparatus 106B or the plurality of target communication apparatuses exceeds a value of the expiryTimer 302, the communication apparatus 104 withdraws the second resource allocated to the target communication apparatus 106A, the other target communication apparatus 106B or the plurality of target communication apparatuses.

The additional fields/information elements may include an allowedSourceID 304a to indicate an ID of a target transmission apparatus that is allowed to transmit signals using the second resource for V2X communications, or an allowedSourceIDList 304b to indicate a list of IDs of target transmission apparatuses that are allowed to transmit signals using the second resource for V2X communications.

The additional fields/information elements may further include an allowedDestinationID 306a to indicate an ID of a target transmission apparatus that is allowed to receive signals using the second resource in V2X communications, or an allowedDestinationIDList 306b to indicate a list of IDs of target transmission apparatuses that are allowed to receive signals using the second resource in V2X communications. In some embodiments, the allowedDestinationID and/or the allowedDestinationIDList may include ID of the communication apparatus 104, ID of a platoon that the communication apparatus 104 belongs to, and/or ID of one or more target communication apparatuses.

In addition, as described above, the second resource information may include a field/element that requiring an AS level connection as a prerequisite for allocation and transmission of resources. As described above, the AS level connection is associated with either a unicast level connection between the communication apparatus 104 with the target communication apparatus 106A or the other target communication apparatus 106B, or a groupcast level connection between the communication apparatus 104 and a plurality of target communication apparatuses that comprises the target communication apparatus 106A and/or the other target communication apparatus 106B.

In view of the above, in some embodiments, when there is a presence of an AS level connection between the communication apparatus 104 and the target communication apparatus 106A, the communication apparatus 104 may transmit information of a second resource to the target communication apparatus 106A including fields of: UE1-SubscriberUE Unicast CONNECTED state only; Allowed Destination ID==Subscriber UE ID; Expiry Timer==10 seconds.

Upon receipt of the second resource, the target communication apparatus 106A may use the second resource to transmit data to the communication apparatus 104 (i.e. Subscriber UE). The second resource is deleted when target communication apparatus 106A loses the AS level connection (i.e. the unicast level connection) to the communication apparatus 104 or when 10 seconds has passed after the second resource is configured on target communication apparatus 106A (whichever occurs first).

In some embodiments, when there is a presence of an AS level connection between the communication apparatus 104 and a plurality of target communication apparatuses including the other target communication apparatus 106B, the communication apparatus 104 may transmit information of another second resource to the other communication apparatus 106B including fields of: SubscriberUE Groupcast CONNECTED state only; Allowed Destination ID==Subscriber UE ID, Group Destination ID.

Upon receipt of the second resource, the other target communication apparatus 106B may use the second resource to transmit data to the communication apparatus 104 (i.e. Subscriber UE) or to the platoon (i.e. Group Destination ID). The second resource is deleted when the other target communication apparatus 106B loses the AS level connection (i.e. the groupcast level connection) to the platoon. It can be seen that resources for transmitting periodic updates may not need an expiry timer.

Figure 4:
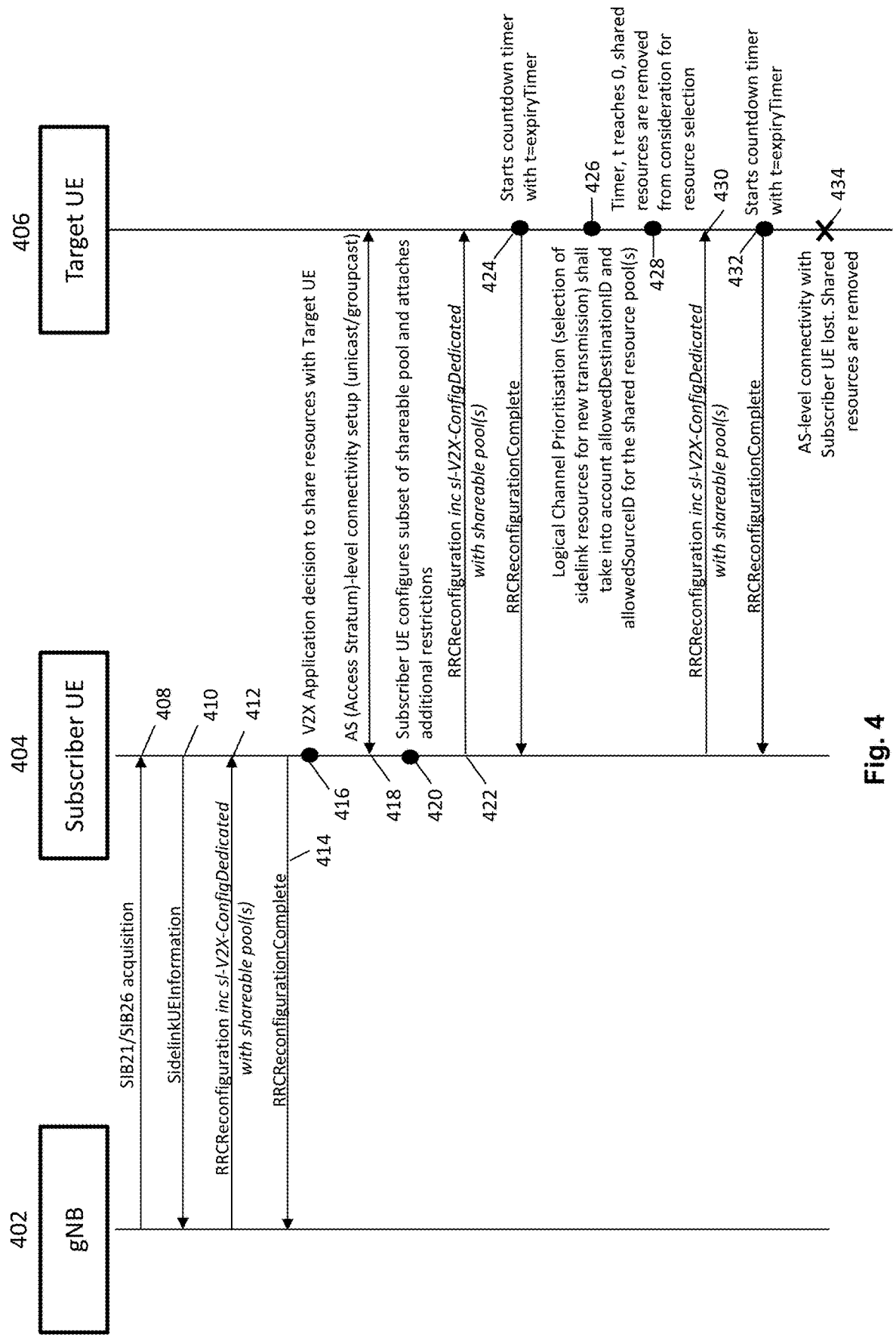
FIG. 4 shows a signal flow between a base station, a communication apparatus and a target communication apparatus in accordance with a first embodiment of the 5G NR based V2X communications as shown in FIG. 1.

FIG. 4 shows a signal flow between a base station 402, a communication apparatus 404 and a target communication apparatus 406 in accordance with a first embodiment of the 5G NR based V2X communications as shown in FIG. 1. In the present embodiment, the target communication apparatus 406 may be connected to the communication apparatus 404 via either a unicast level connection or a groupcast level connection.

In the present embodiment, the base station 402 is a gNB 402. The communication apparatus 404 is referred to as a Subscriber UE 404 and the target communication apparatus 406 is referred to as a Target UE 406.

As described above with respect to FIG. 1, the present embodiment includes at least the following two steps:

Step 412—receiving, at the communication apparatus 404, from the base station 402 a first resource information indicating a first resource allocated by the base station 402.

Step 422—transmitting, from the communication apparatus 404, to the target communication apparatus 406 or a plurality of target communication apparatuses including the target communication apparatus 406 a second resource information indicating a second resource allocated to at least the target communication apparatus 406, the second resource information including a whole or a part of the first resource.

In some examples, prior to the step 412, the communication apparatus 404 acquires system information blocks (SIBs) broadcast by the base station 402 at step 408, especially system information block type 21 (SIB 21) and/or system information block type 26 (SIB 26) that define carrier frequency information for V2X sidelink communications. At step 410, the communication apparatus 404 transmits its sidelinkUEinformation to the base station 402 so as to request allocation of the first resource from the base station 402.

In an embodiment of the step 412 as shown in FIG. 4, the communication apparatus 404 receives the first resource information in a RRCReconfiguration message including a field of sl-V2X-ConfigDedicated with an indication of "with shareable pool(s)" to denote that there are additional elements within the RRCReconfiguration message to indicate the first resource dedicated to the communication apparatus 404 and to indicate that the first resource may further be shared/allocated by the communication apparatus 404. Possible additional elements to indicate the sharable first resource are described with respect to FIG. 2.

In some examples, in response to the receipt of the first resource in step 412, the communication apparatus 404 may send a RRCReconfigurationComplete message at step 414 to the base station 402 to indicate completion of the RRCReconfiguration.

In some examples, the communication apparatus 404 may receive a request at step 416 from a server (not shown) of a V2X service application that requires the communication apparatus 404 to share resources with the target communication apparatus 406 for an one time transfer or periodic updates.

In some examples, in response to the request received at step 416, the communication apparatus 404 may check if it has an AS level connection, either a unicast level connection or a groupcast level connection, with the target communication apparatus 406. If there is no presence of such an AS level connection, the communication apparatus 404 establishes an AS level connection with the target communication apparatus 406 at step 418. The AS level connection can be either a unicast level connection or a groupcast level connection, depending on the practical needs.

In some examples, at step 420, the communication apparatus 404 configures a subset of the first resource to be a second resource, and attaches additional restrictions as described above to optimize the utilisation of the second resource.

In an embodiment of the step 422 as shown in FIG. 4, the communication apparatus 404 transmits to the target communication apparatus 406 the information of the second resource information in a RRCReconfiguration message including a field of sl-V2X-ConfigDedicated with an indication of "with shareable pool(s)" to denote that there are additional elements within the RRCReconfiguration message to indicate the shareable second resource allocated to at least the target communication apparatus 406. In some examples, the indication of "with shareable pool(s)" is implemented by possible additional fields/information elements contained within the SL-CommResourcePool information element/field of the RRCReconfiguration message. The additional fields/information elements may include an expiryTimer which indicates a time limit or an expiry time. When a period of time following the transmission of the second resource information to the target communication apparatus 406 exceeds a value of the expiryTimer, the communication apparatus 404 withdraws the second resource allocated to the target communication apparatus 406. The additional fields/information elements may also include allowedDestinationID and allowedSourceID.

From the perspective of the target communication apparatus 406, at step 422, the target communication apparatus 406 receives from the communication apparatus 404 the second resource information in a RRCReconfiguration message including a field of sl-V2X-ConfigDedicated with an indication of "with shareable pool(s)" to denote that there are additional elements within the RRCReconfiguration message to indicate the shareable second resource allocated to at least the target communication apparatus 406. In some examples, the indication of "with shareable pool(s)" is implemented by possible additional fields/information elements contained within the SL-CommResourcePool information element/field of the RRCReconfiguration message. The additional fields/information elements may include an expiryTimer which indicates a time limit or an expiry time. When a period of time following the transmission of the second resource information to the target communication apparatus 406 exceeds a value of the expiryTimer, the target communication apparatus 406 deletes the second resource allocated to the target communication apparatus 406 from available resources. The additional fields/information elements may also include allowedDestinationID and allowedSourceID.

In the present embodiment, as the communication apparatus 404 has allocated the subset of the first resource as the second resource at step 420, the second resource information includes a part, not a whole, of the first resource.

In some examples, in response to the receipt of the second resource in step 422, the target communication apparatus 406 may send a RRCReconfigurationComplete message to the communication apparatus 404 to indicate completion of the RRCReconfiguration.

In the meanwhile, at step 422, as the RRCReconfiguration is completed, the target communication apparatus 406 starts countdown a timer with t=expiryTimer.

In some examples, at step 426, the target communication apparatus 406 may perform a logical channel prioritization, which includes selection of sidelink resources for new transmission that takes into account allowedDestinationID and allowedSourceID for the second resource. In the present embodiment, the allowedSourceID is an ID of the target communication apparatus 406.

In some examples, at step 428, t reaches 0, the target communication apparatus 406 removes the second resource from consideration for resource selection.

In some examples, the communication apparatus 404 and the target communication apparatus 406 may perform the actions in steps 422 and 424 again at steps 430 and 432.

After step 432, the target communication apparatus 406 may uses the second resource for V2X communication with the allowedDestinationID for a period of time that does not exceed expiryTimer.

However, if within the expiryTimer, the target communication apparatus 406 loses the AS level connection with the communication apparatus 404 at step 434, the V2X communication with the allowedDestinationID will be interrupted and the target communication apparatus 406 will remove the second resource. For example, upon receiving one or more consecutive "AS level connection failure" indications or other indications of radio link failure from lower layers, the target communication apparatus 406 may release the second resource previously configured by the RRCReconfiguration message. From the perspective of the communication apparatus 404, upon receiving one or more consecutive "AS level connection failure" indications or other indications of radio link failure from lower layers, the communication apparatus 404 may withdraw the second resource previously allocated to the target communication apparatus 406.

Figure 5:
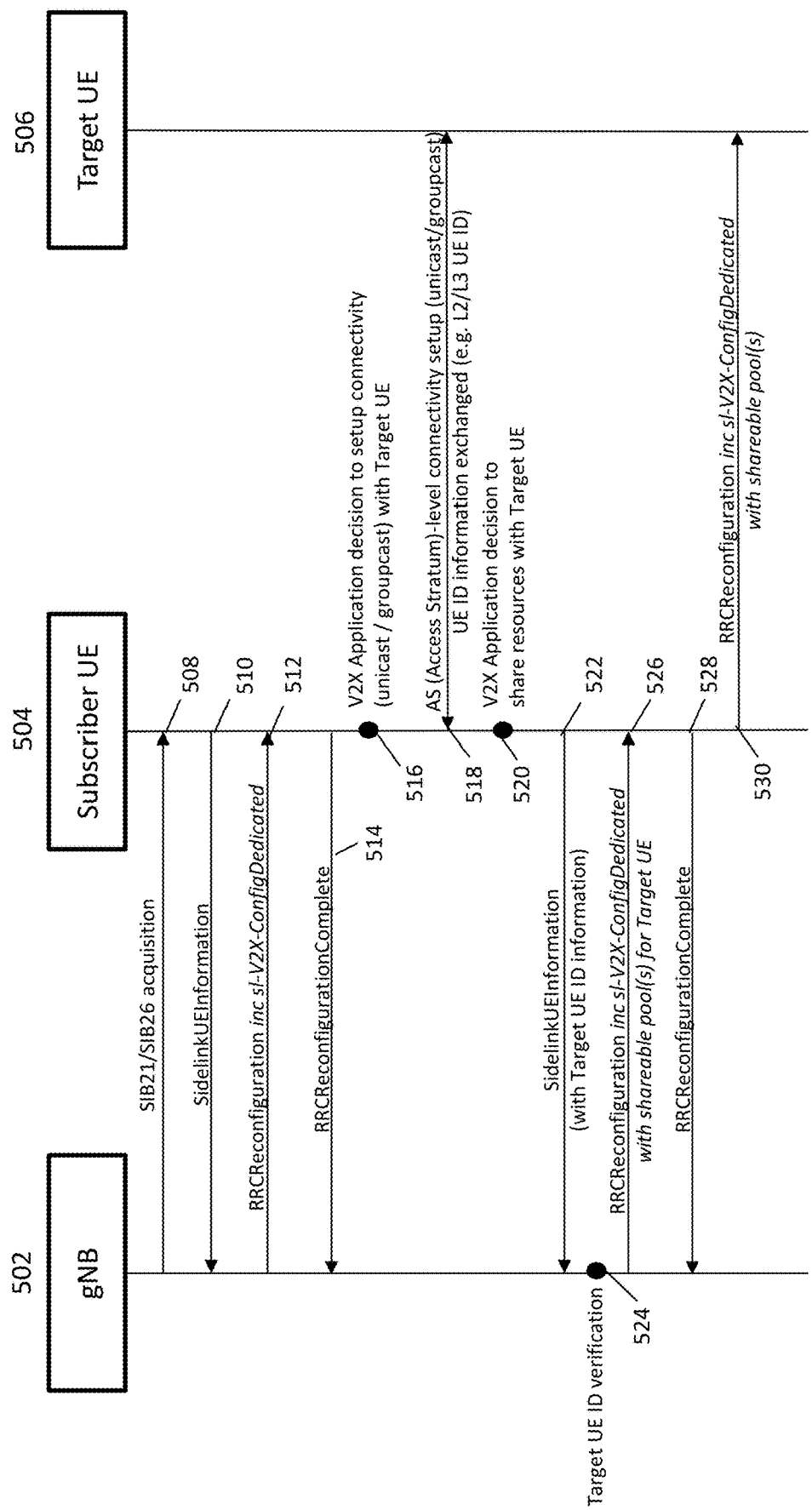
FIG. 5 shows a signal flow between a base station, a communication apparatus and a target communication apparatus in accordance with a second embodiment of the 5G NR based V2X communications as shown in FIG. 1.

FIG. 5 shows a signal flow between a base station 502, a communication apparatus 504 and a target communication apparatus 506 in accordance with a second embodiment of the 5G NR based V2X communications as shown in FIG. 1. In the present embodiment, the target communication apparatus 506 may be connected to the communication apparatus 504 via either a unicast level connection or a groupcast level connection.

In the present embodiment, the base station 502 is a gNB 502. The communication apparatus 504 is referred to as a Subscriber UE 504 and the target communication apparatus 506 is referred to as a Target UE 506.

In the present embodiment, the communication apparatus 504 needs to obtain an explicit approval from the base station 502 before allocating and transmitting a second resource with the target communication apparatus 506. This embodiment allows for a greater operator control over usage of licensed resources. In the event that the target communication apparatus 506 is not a subscriber of the same PLMN as the communication apparatus 504, roaming agreements or other prerequisites may be checked by the base station 502 before allocation of resources of the PLMN.

In some examples, optional steps 508 and 510 are similar to steps 408 and 410 as shown in FIG. 4.

In an embodiment of the step 512 as shown in FIG. 5, the communication apparatus 504 receives information of the first resource in a RRCReconfiguration message including a field of sl-V2X-ConfigDedicated.

In some examples, in response to the receipt of the RRCReconfiguration message in step 512, the communication apparatus 504 may send a RRCReconfigurationComplete message at step 514 to the base station 502 to indicate completion of the RRCReconfiguration.

In some examples, the communication apparatus 504 may receive a request at step 516 from a server (not shown) of a V2X service application that requires the communication apparatus 504 to set up an AS level connection, either a unicast level connection or a groupcast level connection, with the target communication apparatus 506.

In some examples, in response to the request received at step 516, the communication apparatus 504 establishes an AS level connection with the target communication apparatus 506 at step 518. The AS level connection can be either a unicast level connection or a groupcast level connection, depending on the practical needs. During the establishment of the AS level connection, UE ID information (L2/L3 UE ID) of the communication apparatus 504 and the target communication apparatus 506 have been exchanged.

In some examples, at step 520, the communication apparatus 504 may receive a request from the server of the V2X service application that requires the communication apparatus 504 to share resources with the target communication apparatus 506.

In some examples, at step 522, the communication apparatus 504 transmits its sidelinkUEinformation along with UE ID information of the target communication apparatuses 506 to the base station 502 so as to request allocation of resource(s) specifically for the target communication apparatus 506 from the base station 502.

In some examples, at step 524, the base station 502 may verify the UE ID information of the target communication apparatus 506. For example, the base station 502 may first check if the target communication apparatus 506 is a subscriber of the PLMN based on the UE ID information. If the target communication apparatus 506 has subscribed to the PLMN, the base station may verify authentication and/or validity of the UE ID information with a database of the PLMN. If the target communication apparatus 506 has not subscribed to the PLMN of the base station 502, roaming agreements or other prerequisites may be checked before allocation of resources of the PLMN.

In the present embodiment, the verification of step 524 returns a favourable result. At step 526, the base station 502 transmits to the target communication apparatus 506 information of resource(s) specifically allocated to the target communication apparatus 506 in a RRCReconfiguration message including a field of sl-V2X-ConfigDedicated with an indication of "with shareable pool(s)" to denote that there are additional elements within the RRCReconfiguration message to indicate the resource(s) specifically allocated to the target communication apparatus 506 and that the resource(s) can be further shared. The additional elements have been described with respect to FIG. 2.

In some examples, in response to the receipt of the RRCReconfiguration message in step 526, the communication apparatus 504 may send a RRCReconfigurationComplete message at step 528 to the base station 502 to indicate completion of the RRCReconfiguration.

In some examples, at step 530, the communication apparatus 504 may forward the RRCReconfiguration message received at step 526 which includes a field of sl-V2X-ConfigDedicated with an indication of "with shareable pool(s)" to the target communication apparatus 506.

From the perspective of the target communication apparatus 506, at step 522, the target communication apparatus 506 receives from the communication apparatus 504 the information of the resource(s) specifically allocated to the target communication apparatus 506 in a RRCReconfiguration message including a field of sl-V2X-ConfigDedicated with an indication of "with shareable pool(s)" to denote that there are additional elements within the RRCReconfiguration message to indicate the resource(s) specifically allocated to the target communication apparatus 506 and that the resource(s) can be further shared.

Figure 6:
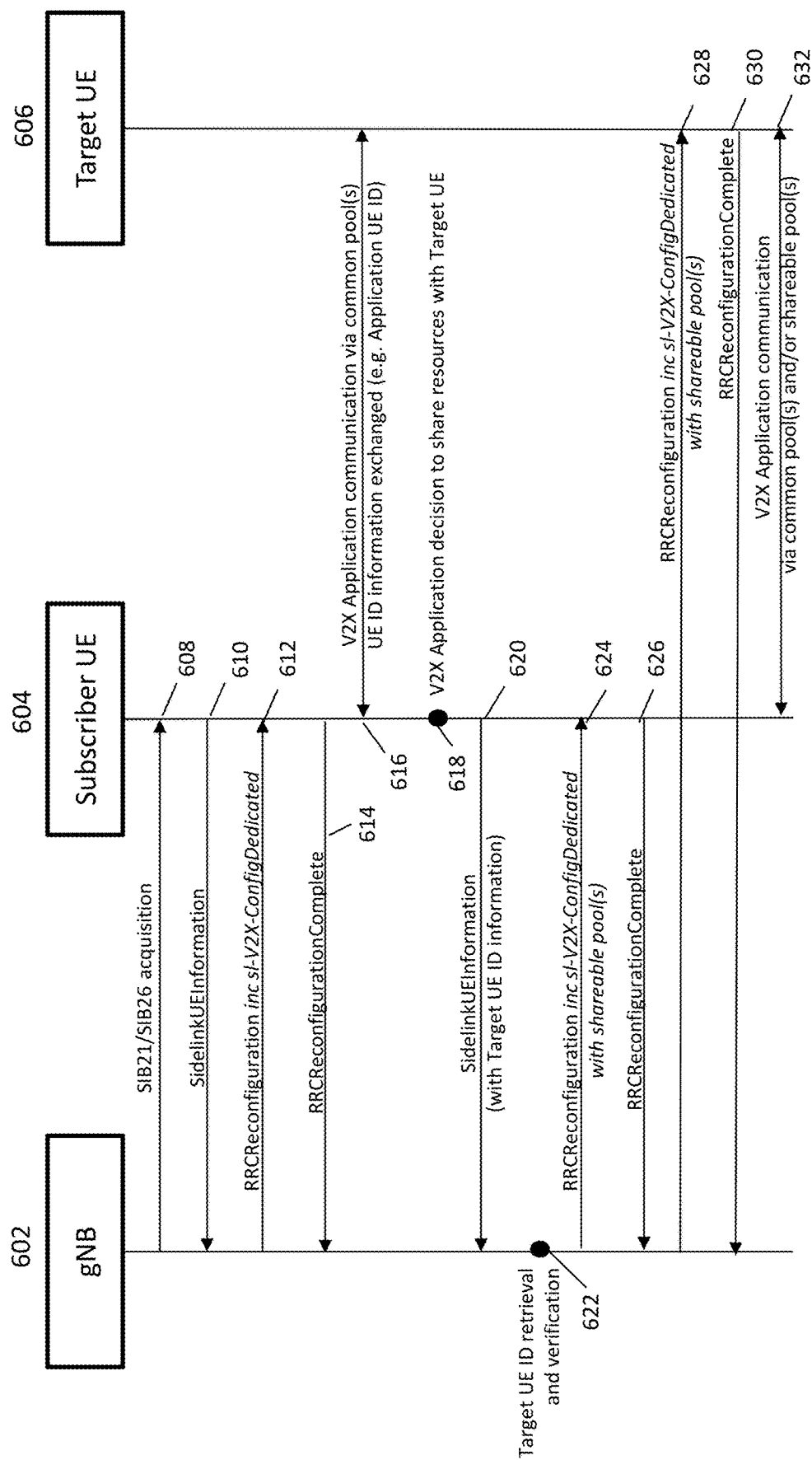
FIG. 6 shows a signal flow between a base station, a communication apparatus and a target communication apparatus in accordance with a third embodiment of the 5G NR based V2X communications as shown in FIG. 1.

FIG. 6 shows a signal flow between a base station 602, a communication apparatus 604 and a target communication apparatus 606 in accordance with a third embodiment of the 5G NR based V2X communications as shown in FIG. 1. In the present embodiment, the target communication apparatus 606 may be connected to the communication apparatus 604 via either a unicast level connection or a groupcast level connection.

In the present embodiment, the base station 602 is a gNB 602. The communication apparatus 604 is referred to as a Subscriber UE 604 and the target communication apparatus 606 is referred to as a Target UE 506.

In the present embodiment, the target communication apparatus 606 may directly communicate with the base station 602 to obtain shareable resources directly from the base station 602. This solution allows for a greater operator control over usage of licensed resources.

In the present embodiment, no control plane signaling over sidelink is required. That is, there is no need for a presence of an AS level connection between the communication apparatus 604 and the target communication apparatus 606.

In some examples, optional steps 608 and 610 are similar to steps 408 and 410 as shown in FIG. 4.

In an embodiment of the step 612 as shown in FIG. 6, the communication apparatus 604 receives information of the first resource in a RRCReconfiguration message including a field of sl-V2X-ConfigDedicated, which indicate common resource(s).

In some examples, in response to the receipt of the RRCReconfiguration message in step 612, the communication apparatus 604 may send a RRCReconfigurationComplete message at step 614 to the base station 602 to indicate completion of the RRCReconfiguration.

In some examples, at step 616, the communication apparatus 604 establishes a V2X application communication with the target communication apparatus 606 via common resource(s) indicated in the field of sl-V2X-ConfigDedicated of the RRCReconfiguration message. During the establishment of the V2X application communication, UE ID information (L2/L3 UE ID) of the communication apparatus 604 and the target communication apparatus 606 have been exchanged.

In some examples, at step 618, the communication apparatus 504 may receive a request from a server (not shown) of the V2X application that requires the communication apparatus 604 to share resources with the target communication apparatus 606.

In some examples, at step 620, the communication apparatus 604 transmits its sidelinkUEinformation along with UE ID information of the target communication apparatuses 606 to the base station 602 so as to request allocation of resource(s) shareable to the target communication apparatus 606 from the base station 602.

In some examples, at step 622, the base station 602 may verify the UE ID information of the target communication apparatus 606. For example, the base station 602 may first check if the target communication apparatus 606 is a subscriber of the PLMN based on the UE ID information. If the target communication apparatus 606 has subscribed to the PLMN, the base station may verify authentication and/or validity of the UE ID information with a database of the PLMN. If the target communication apparatus 606 has not subscribed to the PLMN of the base station 602, roaming agreements or other prerequisites may be checked before allocation of resources of the PLMN.

In the present embodiment, the verification of step 622 returns a favourable result. At step 624, the base station 602 transmits to the communication apparatus 604 information of allocated resource(s) that are shareable to the target communication apparatus 606 in a RRCReconfiguration message including a field of sl-V2X-ConfigDedicated with an indication of "with shareable pool(s)" to denote that there are additional elements within the RRCReconfiguration message to indicate the allocated resource(s) to the target communication apparatus 604 and that the resource(s) can be further shared. The additional elements have been described with respect to FIG. 2.

In some examples, in response to the receipt of the RRCReconfiguration message in step 626, the communication apparatus 604 may send a RRCReconfigurationComplete message to the base station 602 to indicate completion of the RRCReconfiguration.

Subsequent to the step 624 or simultaneously with the step 624, the base station 602 transmits, at step 628, to the target communication apparatus 606 information of allocated resource(s) in a RRCReconfiguration message including a field of sl-V2X-ConfigDedicated with an indication of "with shareable pool(s)" to denote that there are additional elements within the RRCReconfiguration message to indicate the allocated resource(s) to the target communication apparatus 606 and that the resource(s) can be further shared. The additional elements have been described with respect to FIG. 2.

In response to the receipt of the RRCReconfiguration message in step 628, the target communication apparatus 606 may send a RRCReconfigurationComplete message at step 630 to the base station 602 to indicate completion of the RRCReconfiguration.

In some examples, in step 630, a V2X communication transmitting can be established between the communication apparatus 604 and the target communication apparatus 606 via common resource(s) and/or allocated shareable resource(s). The communication apparatus 604 may transmit a first signal to the target communication apparatus 606 using the common resource(s) and/or allocated shareable resource(s), and the target communication apparatus 606 may transmit a second signal to the communication apparatus 604 using the common resource(s) and/or allocated shareable resource(s).

Figure 7:
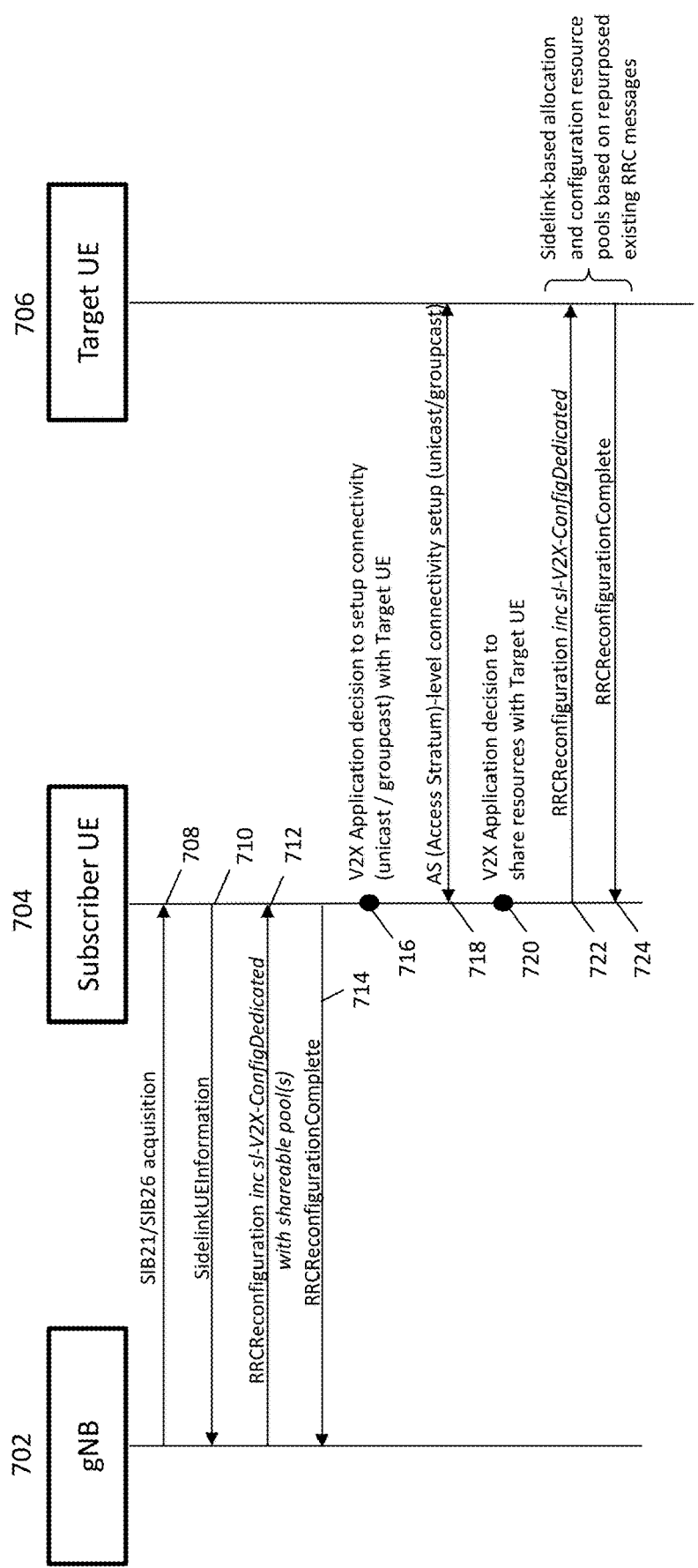
FIG. 7 shows a signal flow between a base station, a communication apparatus and a target communication apparatus in accordance with a fourth embodiment of the 5G NR based V2X communications as shown in FIG. 1.

FIG. 7 shows a signal flow between a base station 702, a communication apparatus 704 and a target communication apparatus 706, in accordance with a fourth embodiment of the 5G NR based V2X communications as shown in FIG. 1. In the present embodiment, the target communication apparatus 706 may be connected to the communication apparatus 704 via either a unicast level connection or a groupcast level connection.

In the present embodiment, the base station 702 is a gNB 702. The communication apparatus 704 is referred to as a Subscriber UE 704 and the target communication apparatus 706 is referred to as a Target UE 706.

In the present embodiment, the interaction between the communication apparatus 704 and target communication apparatus 706 largely repurposes the existing message exchanges between the base station 702 and the communication apparatus 704.

In some examples, optional steps 708 and 710 are similar to steps 408 and 410 as shown in FIG. 4.

In some examples, at step 712, the communication apparatus 704 receives information of the first resource in a RRCReconfiguration message including a field of sl-V2X-ConfigDedicated with an indication of "with shareable pool(s)" to denote that there are additional elements within the RRCReconfiguration message to indicate the first resource dedicated to the communication apparatus 704 and to indicate that the first resource may further be shared/allocated by the communication apparatus 704. Possible additional elements to indicate the sharable first resource are described with respect to FIG. 2.

In some examples, in response to the receipt of the first resource in step 712, the communication apparatus 704 may send a RRCReconfigurationComplete message at step 714 to the base station 702 to indicate completion of the RRCReconfiguration.

In some examples, the communication apparatus 704 may receive a request at step 716 from a server (not shown) of a V2X service application that requires the communication apparatus 704 to set up an AS level connection, either a unicast level connection or a groupcast level connection, with the target communication apparatus 706.

In some examples, in response to the request received at step 716, the communication apparatus 704 establishes an AS level connection with the target communication apparatus 706 at step 718. The AS level connection can be either a unicast level connection or a groupcast level connection, depending on the practical needs.

In some examples, at step 720, the communication apparatus 704 may receive a request from the server of the V2X service application that requires the communication apparatus 704 to share resources with the target communication apparatus 706.

In some examples, at step 722, the communication apparatus 704 transmits to the target communication apparatus 706 information of the first resource in a RRCReconfiguration message including a field of sl-V2X-ConfigDedicated, which indicate common resource(s).

In some examples, in response to the receipt of the RRCReconfiguration message in step 722, the target communication apparatus 706 may send a RRCReconfigurationComplete message at step 724 to the communication apparatus 704 to indicate completion of the RRC Reconfiguration.

At steps 722 and 724, sidelink-based allocation and configuration of the common resource(s) is based on repurposed the existing RRC messages. In this manner. This indicates that common resource(s) and licensed/private resource(s) are flexibly and dynamically allocated and transmitted by communication apparatus 704.

FIG. 8 shows a schematic, partially sectioned view of a communication apparatus 104, 304, 404, 504, 604, 704 that can be implemented for establishing the 5G NR based V2X communications in accordance with various embodiments as shown in FIGS. 1 to 7.

Various functions and operations of the communication apparatus 104, 304, 404, 504, 604, 704 are arranged into layers in accordance with a hierarchical model. In the model, lower layers report to higher layers and receive instructions therefrom in accordance with 3GPP 5G NR specifications. For the sake of simplicity, details of the hierarchical model are not discussed in the present disclosure.

As shown in FIG. 8, the communication apparatus 104, 304, 404, 504, 604, 704 is typically provided with at least one radio transmitter 802, at least one radio receiver 804, at least one antenna 808 and at least one controller 806 for use in software and hardware aided execution of tasks it is designed to perform, including control of allocation and/or transmission of second resources to the target communication apparatus 106A, 106B, 306, 406, 506, 606, 706. The data processing, storage and other relevant control apparatus can be provided on an appropriate circuit board and/or in chipsets. In various embodiments, when in operation, the at least one radio transmitter 802, at least one radio receiver 804 and at least one antenna 808 may be controlled by the at least one controller 806.

In some embodiments of the communication apparatus 104, 304, 404, 504, 604, 704, the at least one radio receiver 804, when in operation, receives from a base station a first resource information indicating a first resource allocated by the base station; and the at least one radio transmitter 802, when in operation, transmits to a target communication apparatus or a plurality of target communication apparatuses including the target communication apparatus a second resource information indicating a second resource allocated to at least the target communication apparatus, the second resource information including a whole or a part of the first resource.

In some embodiments of the communication apparatus 104, 304, 404, 504, 604, 704, the at least one radio receiver 804, when in operation, receives the first resource information by a dedicated signaling from the base station, and the at least one radio transmitter 802, when in operation, transmits the second resource information by another dedicated signaling to the target communication apparatus or to the plurality of target communication apparatuses.

In some embodiments of the communication apparatus 104, 304, 404, 504, 604, 704, when there is a presence of an access stratum (AS) level connection between the communication apparatus and the target communication apparatus, the at least one radio transmitter 802, when in operation, transmits the second resource information to the target communication apparatus.

In some embodiments of the communication apparatus 104, 304, 404, 504, 604, 704, when there is a presence of an access stratum (AS) level connection between the communication apparatus and the plurality of target communication apparatuses, the at least one radio transmitter 802, when in operation, transmits the second resource information to one or more target communication apparatuses of the plurality of target communication apparatuses, the one or more target communication apparatuses including the target communication apparatus, the second resource being further allocated to the plurality of target communication apparatuses.

In some embodiments of the communication apparatus 104, 304, 404, 504, 604, 704, when there is no presence of an access stratum (AS) level connection with the target communication apparatus or the plurality of target communication apparatuses, the at least one radio transmitter 802, when in operation, establishes the AS level connection with the target communication apparatus or the plurality of target communication apparatuses before transmitting the second resource information.

In some embodiments of the communication apparatus 104, 304, 404, 504, 604, 704, the first resource is a frequency band that is different from a resource directly allocated to the target communication apparatus or the plurality of target communication apparatuses by the base station.

In some embodiments of the communication apparatus 104, 304, 404, 504, 604, 704, the second resource is used to transmit a first signal from the communication apparatus 800 to the target communication apparatus or the plurality of target communication apparatuses and to receive a second signal from the target communication apparatus or the plurality of target communication apparatuses.

In some embodiments of the communication apparatus 104, 304, 404, 504, 604, 704, the second resource information includes one or more fields that facilitate the target communication apparatus to choose the second resource from a plurality of available resources for data transmission, the one or more fields indicating an expiry time, an allowed destination ID, a list of allowed destination IDs, an allowed source ID, and/or a list of allowed source IDs for using the second resource, and wherein when a period of time following the transmission of the second resource information exceeds the expiry time, the communication apparatus withdraws the second resource allocated to the target communication apparatus or the plurality of target communication apparatuses.

In some embodiments of the communication apparatus 104, 304, 404, 504, 604, 704, when the communication apparatus loses an access stratum (AS) level connection with the target communication apparatus or the plurality of target communication apparatuses, the communication apparatus withdraws the second resource allocated to the target communication apparatus or the plurality of target communication apparatuses.

FIG. 9 shows a schematic example 900 of target communication apparatuses that can be implemented to establish the 5G NR based V2X communications in accordance with various embodiments as shown in FIGS. 1 to 7. It is appreciable to those skilled in the art that the one or more target communication apparatuses 106A, 106B, 306, 406, 506, 606, 706 according to the schematic example 900 of FIG. 9 may have a similar structure as shown in FIG. 8.

Similar to the communication apparatus 104, 304, 404, 504, 604, 704, various functions and operations of the one or more target communication apparatuses 106A, 106B, 306, 406, 506, 606, 706 are arranged into layers in accordance with a hierarchical model. In the model, lower layers report to higher layers and receive instructions therefrom in accordance with 3GPP 5G NR specifications. For the sake of simplicity, details of the hierarchical model are not discussed in the present disclosure.

As shown in FIG. 9, the target communication apparatus 106A, 106B, 306, 406, 506, 606, 706 is typically provided with at least one radio transmitter 902, at least one radio receiver 904, at least one antenna 908 and at least one controller 906 for use in software and hardware aided execution of tasks it is designed to perform, including control of receipt of a second source information from the communication apparatus 104, 304, 404, 504, 604, 704 and/or transmission of a signal to the communication apparatus 104, 304, 404, 504, 604, 704 or to another target communication apparatus among a plurality of target communication apparatuses that includes the target communication apparatus using the second resource. The data processing, storage and other relevant control apparatus can be provided on an appropriate circuit board and/or in chipsets. In various embodiments, when in operation, the at least one radio transmitter 902, at least one radio receiver 904 and at least one antenna 908 may be controlled by the at least one controller 906.

In some embodiments of the target communication apparatus 106A, 106B, 306, 406, 506, 606, 706, the at least one radio receiver 904, when in operation, receives from a communication apparatus a second resource information indicating a second resource allocated to at least the target communication apparatus, wherein the second resource information includes a whole or a part of a first resource allocated to the communication apparatus by a base station; and the at least one radio transmitter 902, when in operation, transmits a signal to the communication apparatus or to another target communication apparatus among a plurality of target communication apparatuses that includes the target communication apparatus using the second resource.

In some embodiments of the target communication apparatus 106A, 106B, 306, 406, 506, 606, 706, the at least one radio receiver 904, when in operation, receives the second resource information via a dedicated signaling.

In some embodiments of the target communication apparatus 106A, 106B, 306, 406, 506, 606, 706, when there is a presence of an access stratum (AS) level connection between the target communication apparatus and the communication apparatus, the at least one radio receiver 904, when in operation, receives the second resource information from the communication apparatus.

In some embodiments of the target communication apparatus 106A, 106B, 306, 406, 506, 606, 706, when there is a presence of an access stratum (AS) level connection between the plurality of target communication apparatus and the communication apparatus, the at least one radio receiver 904, when in operation, receives the second resource information, along with one or more receivers of other target communication apparatuses among the plurality of target communication apparatuses, from the communication apparatus, the second resource being further allocated to the plurality of target communication apparatuses.

In some embodiments of the target communication apparatus 106A, 106B, 306, 406, 506, 606, 706, when there is no presence of an access stratum (AS) level connection between the target communication apparatus or the plurality of target communication apparatuses and the communication apparatus, the at least one radio receiver 904, in operation, establishes the AS level connection with the communication apparatus before receiving the second resource information.

In some embodiments of the target communication apparatus 106A, 106B, 306, 406, 506, 606, 706, wherein the first resource is a frequency band that is different from a resource directly allocated to the target communication apparatus or the plurality of target communication apparatuses by the base station.

In some embodiments of the target communication apparatus 106A, 106B, 306, 406, 506, 606, 706, wherein the second resource is used to receive a first signal from the communication apparatus to the target communication apparatus or the plurality of target communication apparatuses and to transmit a second signal from the target communication apparatus or the plurality of target communication apparatuses to the communication apparatus.

In some embodiments of the target communication apparatus 106A, 106B, 306, 406, 506, 606, 706, wherein the second resource information includes one or more fields that facilitate the target communication apparatus to choose the second resource from a plurality of available resources for data transmission, the one or more fields indicating an expiry time, an allowed destination ID, a list of allowed destination IDs, an allowed source ID, and/or a list of allowed source IDs for using the second resource, and wherein when a period of time following the receipt of the second resource information exceeds the expiry time, the target communication apparatus deletes the second resource from available resources.

In some embodiments of the target communication apparatus 106A, 106B, 306, 406, 506, 606, 706, when the target communication apparatus or the plurality of target communication apparatuses lose an access stratum (AS) level connection with the communication apparatus, the target communication apparatus deletes the second resource from available resources.

As described above, the embodiments of the present disclosure provides an advanced communication system, communication methods and communication apparatuses that enables dynamic and flexible allocation of resources by communication apparatuses/subscriber UEs for achieving a 5G NR based V2X communication that has a great data rate, low latency and enhanced system reliability.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. An integrated circuit, comprising:
   determination circuitry, which in operation, controls determining a second resource based on control information transmitted from another communication apparatus, the second resource being a part of a first resource which is a resource pool used for a sidelink communication and which is configured at a base station; and
   transmission circuitry, which in operation, controls transmitting on the second resource data to the another communication apparatus.

2. The integrated circuit according to claim 1, wherein the control information is transmitted by a dedicated signaling from the another communication apparatus.

3. The integrated circuit according to claim 1, wherein when there is a presence of an access stratum (AS) level connection between a communication apparatus and the another communication apparatus, the control information is transmitted from the another communication apparatus.

4. The integrated circuit according to claim 1, wherein when there is no presence of an access stratum (AS) level connection with the another communication apparatus, the AS level connection with the another communication apparatus is established before transmitting the second resource information.

5. The integrated circuit according to claim 1,
   wherein the control information includes a field indicating an expiration time, and
   wherein in response to a period of time following the transmission of the control information exceeding the expiration time, a communication apparatus of the integrated circuit withdraws the second resource to be used for a transmission of the data.

6. An integrated circuit, comprising:
   determination circuitry, which in operation, controls determining a second resource, the second resource being a part of a first resource which is a resource pool used for a sidelink communication and which is configured at a base station; and
   transmission circuitry, which in operation, controls transmitting control information relating to the second resource to another communication apparatus.

7. The integrated circuit according to claim 6,
   wherein the control information includes a field indicating an expiration time, and
   wherein in response to a period of time exceeding the expiration time, a communication apparatus including the integrated circuit withdraws the second resource to be used for a data transmission.

\* \* \* \* \*